(12) United States Patent
Kakitsu et al.

(10) Patent No.: US 8,301,192 B2
(45) Date of Patent: Oct. 30, 2012

(54) PORTABLE WIRELESS DEVICE

(75) Inventors: Haruhiko Kakitsu, Sendai (JP); Takahiro Ochi, Sendai (JP)

(73) Assignee: Panasonic Corporation, Osaka (JP)

( * ) Notice: Subject to any disclaimer, the term of this patent is extended or adjusted under 35 U.S.C. 154(b) by 327 days.

(21) Appl. No.: 12/742,091

(22) PCT Filed: Sep. 30, 2008

(86) PCT No.: PCT/JP2008/002736
§ 371 (c)(1),
(2), (4) Date: May 7, 2010

(87) PCT Pub. No.: WO2009/063587
PCT Pub. Date: May 22, 2009

(65) Prior Publication Data
US 2010/0267415 A1   Oct. 21, 2010

(30) Foreign Application Priority Data

Nov. 12, 2007  (JP) .................................. 2007-293481

(51) Int. Cl.
*H04M 1/00*   (2006.01)
(52) U.S. Cl. ................... 455/553.1; 455/562.1; 455/101; 455/552.1; 455/575.7
(58) Field of Classification Search .................. 455/101, 455/78, 552.1, 553.1, 560–562.1, 575.7; 343/702
See application file for complete search history.

(56) References Cited

U.S. PATENT DOCUMENTS

| | | | | |
|---|---|---|---|---|
| 5,548,836 A | * | 8/1996 | Taromaru | 455/277.1 |
| 5,701,596 A | * | 12/1997 | Meredith et al. | 455/103 |
| 5,940,454 A | * | 8/1999 | McNicol et al. | 375/347 |
| 6,600,931 B2 | * | 7/2003 | Sutton et al. | 455/552.1 |
| 6,850,738 B2 | * | 2/2005 | Nokkonen et al. | 455/83 |
| 6,862,433 B2 | * | 3/2005 | Callaway, Jr. | 455/101 |
| 7,058,434 B2 | * | 6/2006 | Wang et al. | 455/575.7 |
| 7,142,824 B2 | * | 11/2006 | Kojima et al. | 455/78 |
| 7,251,503 B2 | * | 7/2007 | Shirakata et al. | 455/562.1 |
| 7,444,166 B2 | * | 10/2008 | Sahota | 455/553.1 |

(Continued)

FOREIGN PATENT DOCUMENTS

JP   05-316010 A   11/1993

(Continued)

OTHER PUBLICATIONS

International Search Report, mailed Dec. 16, 2008, issued in corresponding International Application No. PCT/JP2008/002736, filed Sep. 30, 2008.

*Primary Examiner* — Sharad Rampuria
(74) *Attorney, Agent, or Firm* — Seed IP Law Group PLLC

(57) ABSTRACT

A portable wireless device having a plurality of wireless sections capable of diversity operation which can reduce the size, thickness, weight and manufacturing cost by reducing the number of antennas. The portable wireless device (100) comprises first through third main antenna devices (101-103), first through third wireless sections (111-113) connected, respectively, with the first through third main antenna devices (101-103) and capable of diversity operation, a sub-antenna device (121) for diversity operation connected with any one of the first through third wireless sections (111-113) at the time of diversity operation, and a section (120) for switching connection of the sub-antenna device (121) with any one of the first through third wireless sections (111-113) at the time of diversity operation.

5 Claims, 10 Drawing Sheets

U.S. PATENT DOCUMENTS

| | | | |
|---|---|---|---|
| 7,561,904 B2 * | 7/2009 | Lagnado | 455/575.7 |
| 7,796,955 B2 * | 9/2010 | Gau et al. | 455/73 |
| 8,024,003 B2 * | 9/2011 | Cezanne et al. | 455/562.1 |

FOREIGN PATENT DOCUMENTS

| | | | |
|---|---|---|---|
| JP | 10-032528 A | | 2/1998 |
| JP | 10-229359 A | | 8/1998 |
| JP | 2002-237764 A | | 8/2002 |
| JP | 2004-007162 A | | 1/2004 |
| JP | 2004-104184 A | | 4/2004 |
| JP | 2004104184 A | * | 4/2004 |
| JP | 2004-140458 A | | 5/2004 |

* cited by examiner

PORTABLE WIRELESS DEVICE

TECHNICAL FIELD

The present invention relates to a portable radio device such as a mobile phone, and more particularly to a portable radio device having a plurality of radio sections capable of diversity operation.

BACKGROUND ART

An antenna apparatus is provided in various kinds of communication devices, and transmits and receives radio waves of a predetermined frequency band. The growing popularity and application range of portable radio devices typified by mobile phones has led to a great increase in demand for wideband capability of portable radio device antennas, and a trend associated with the rapidly expanding use of portable radio devices is for the number of channels in one wireless communication system to be insufficient. Consequently, consideration has been given to the combined use of mutually different wireless communication systems using mutually different frequency bands to secure a necessary number of channels, and major advances in techniques for reducing size and weight have led to the development of terminals enabling two different kinds of wireless communication systems to be used by a single portable radio device. Moreover, consideration has been given to the need for a bandwidth of several hundred MHz in the UHF band for reception of terrestrial digital broadcasts, for example. Furthermore, reducing the size of a radio apparatus by supporting a plurality of WLAN (Wireless Local Area Network) standards using different frequency bands by means of a single antenna requires, for example, an antenna covering the 2.4 GHz and 5.2 GHz bands.

In communications between a mobile station and base station in a mobile communication system, fading often occurs in which the received signal level fluctuates according to various radio wave propagation environments. Effective measures against fading include antenna selective diversity and combined diversity. With antenna selective diversity, a plurality of normal antennas are installed, and communication is performed by switching to an antenna with good conditions when reception degrades due to fading. For example, there are antenna selective diversity apparatuses in a TDMA (Time Division Multiple Access) communication system in which the same frequency is shared by a plurality of users by means of time division.

Patent Document 1 discloses a mobile wireless telephone that performs diversity operation only when using an external antenna in order to reduce the size and standby current of a diversity mobile wireless telephone.

Patent Document 2 discloses an antenna switching circuit and communication device that provide an antenna switching circuit with little signal loss capable of performing antenna diversity independently for each of a plurality of communication systems by using a duplexer.

FIG. 1 is a drawing showing a configuration of a conventional portable radio device having a plurality of radio sections capable of diversity operation.

In FIG. 1, portable radio device 1 having a plurality of radio sections capable of diversity operation is equipped with first through third main antenna apparatuses 11 through 13, first through third radio sections 21 through 23 connected to first through third main antenna apparatuses 11 through 13 respectively, and first through third sub-antenna apparatuses 31 through 33 for diversity operation of first through third radio sections 21 through 23.

First through third radio sections 21 through 23 are radio sections capable of diversity operation that perform diversity operation by performing antenna switching between first main antenna apparatus 11 and first sub-antenna apparatus 31, second main antenna apparatus 12 and second sub-antenna apparatus 32, and third main antenna apparatus 13 and third sub-antenna apparatus 33, connected to the respective radio sections.

First radio section 21 is an HSDPA (High Speed Downlink Packet Access) mobile phone radio section that transmits and receives usable frequency f1 radio waves. An HSDPA diversity receiving apparatus in a W-CDMA system performs diversity reception, creates a delay profile on a branch-by-branch basis, and assigns fingers to received signals based on that delay profile.

Second radio section 22 is, for example, a digital TV tuner for one-segment broadcasting reception that receives a usable frequency f2 radio wave.

Third radio section 23 is a WLAN radio section that transmits and receives usable frequency f3 radio waves. The above combination of radio sections 21 through 23 is just one example, and another example of above radio sections 21 through 23 is a UWB (Ultra Wideband) radio section capable of diversity operation.

Patent Document 1: Japanese Patent Application Laid-Open No. HEI 5-316010
Patent Document 2: Japanese Patent Application Laid-Open No. 2004-7162

DISCLOSURE OF INVENTION

Problems to be Solved by the Invention

However, a problem with this kind of conventional portable radio device having a plurality of radio sections is that the installation of a plurality of diversity antennas results in a larger set size and increased manufacturing cost.

In particular, with a portable radio device having a plurality of radio sections capable of diversity operation, a diversity antenna is installed for each of the plurality of radio sections, so that space must be found for installation of the diversity antennas in an already small case. Moreover, a certain area and volume are necessary in order to secure antenna gain, making parts mounting inside the case difficult. In addition, an increase in manufacturing cost due to the use of a plurality of diversity antennas is unavoidable.

The present invention has been implemented taking into account the problems described above, and it is an object of the present invention to provide a portable radio device having a plurality of radio sections capable of diversity operation that enables size, thickness, weight, and manufacturing cost to be reduced by reducing the number of antennas.

Means for Solving the Problem

An antenna apparatus of the present invention employs a configuration having: a first radio section capable of diversity operation; a first antenna connected to the first radio section; a second radio section capable of diversity operation; a second antenna connected to the second radio section; a third antenna that can be connected to the first radio section or the second radio section at the time of diversity operation; and a switching section that switches connection of the third antenna to the first radio section or the second radio section.

An antenna apparatus of the present invention employs a configuration having: n radio sections capable of diversity operation; n main antennas connected respectively to the n radio sections; a sub-antenna that can be connected to the n radio sections at the time of diversity operation; and a switching section that connects the sub-antenna to any one of the n radio sections that executes diversity operation.

Advantageous Effects of Invention

The present invention reduces the number of antennas in a portable radio device having a plurality of radio sections capable of diversity operation by sharing one diversity antenna among the plurality of radio sections, enabling size, thickness, weight, and manufacturing cost to be reduced.

BEST MODE FOR CARRYING OUT THE INVENTION

Now, embodiments of the present invention will be described in detail with reference to the accompanying drawings.

Embodiment 1

Figure 1:
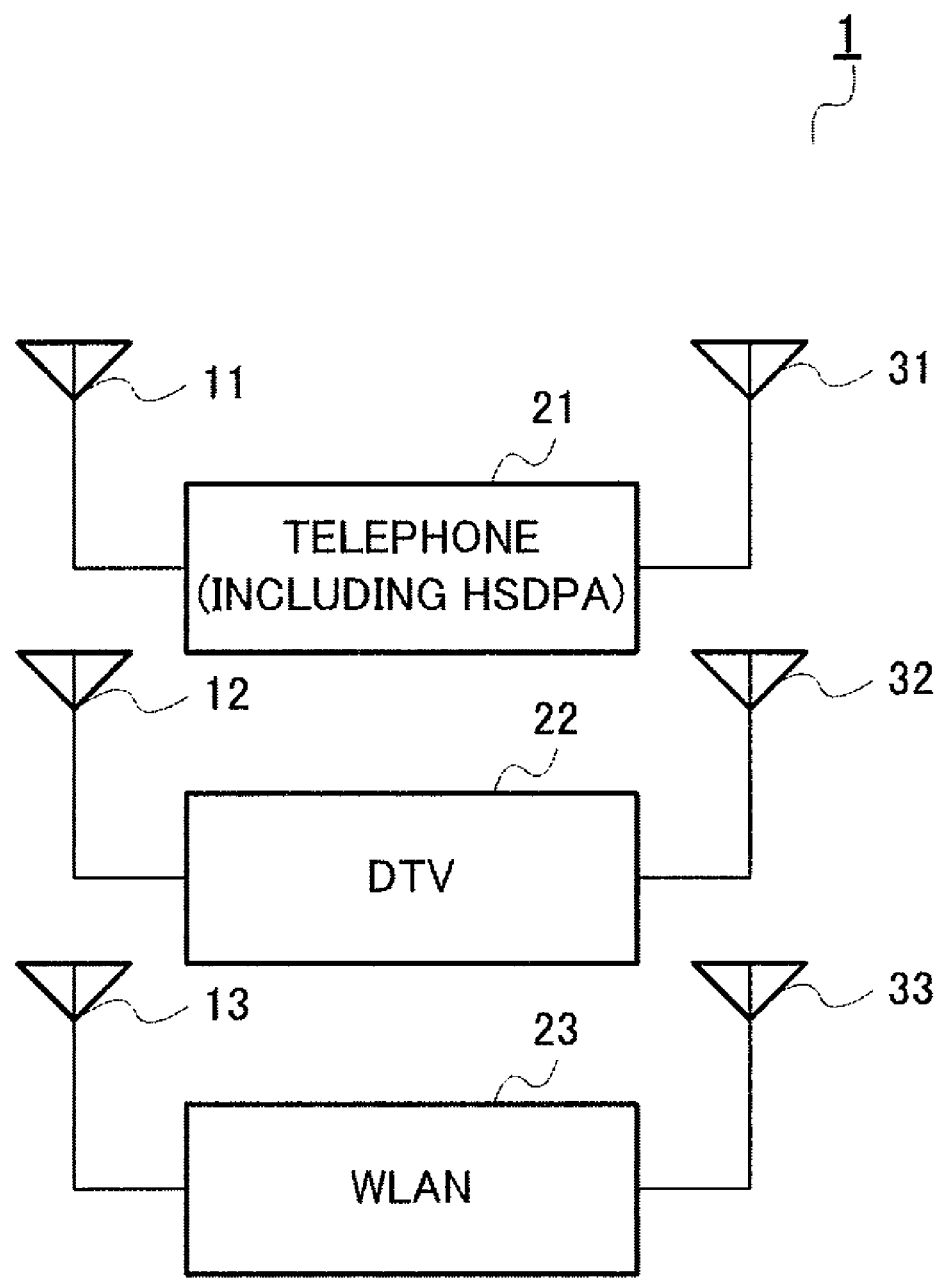
FIG. 1 is a drawing showing a configuration of a conventional portable radio device having a plurality of radio sections capable of diversity operation.
Figure 2:
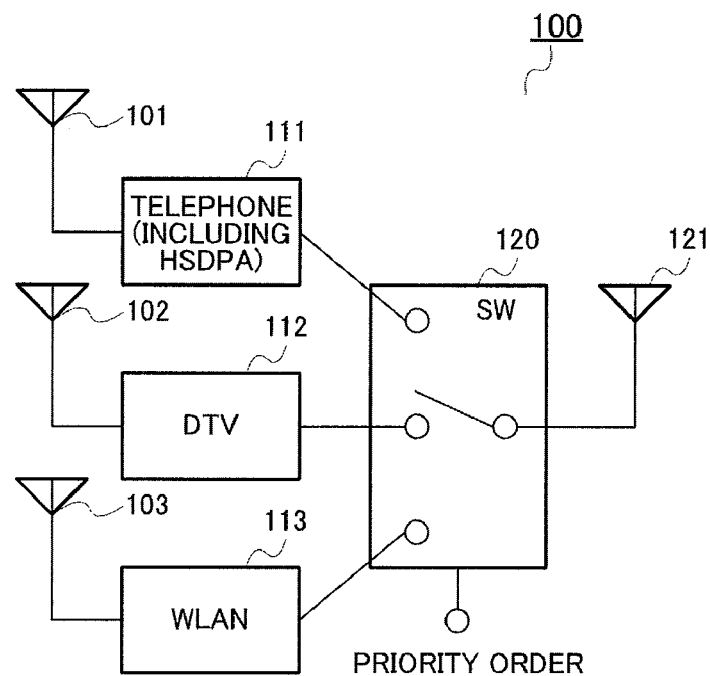
FIG. 2 is a drawing showing a configuration of a portable radio device according to Embodiment 1 of the present invention.

FIG. 2 is a drawing showing a configuration of a portable radio device having a plurality of radio sections capable of diversity operation according to Embodiment 1 of the present invention.

In FIG. 2, portable radio device 100 having a plurality of radio sections capable of diversity operation comprises first through third main antenna apparatuses 101 through 103, first through third radio sections 111 through 113 capable of diversity operation that are connected to first through third main antenna apparatuses 101 through 103 respectively, sub-antenna apparatus 121 for diversity operation that is connected to any one of first through third radio sections 111 through 113, and switching section 120 that switches connection of sub-antenna apparatus 121 to any one of first through third radio sections 111 through 113 at the time of diversity operation.

First through third radio sections 101 through 103 are radio sections capable of diversity operation. First radio section 111 performs diversity operation by means of first main antenna apparatus 101 and sub-antenna apparatus 121, second radio section 112 by means of second main antenna apparatus 102 and sub-antenna apparatus 121, and third radio section 113 by means of third main antenna apparatus 103 and sub-antenna apparatus 121.

First radio section 111 is an HSDPA mobile phone radio section that transmits and receives usable frequency f1 radio waves.

Second radio section 112 is, for example, a digital TV tuner for one-segment broadcasting reception that receives a usable frequency f2 radio wave.

Third radio section 113 is a WLAN radio section that transmits and receives usable frequency f3 radio waves. The above combination of radio sections 111 through 113 is just one example, and another example of above radio sections 111 through 113 is a UWB radio section capable of diversity operation.

Switching section 120 connects any one of first through third radio sections 111 through 113 to sub-antenna apparatus 121 in accordance with a control signal input from outside. In this embodiment, switching section 120 connects one sub-antenna apparatus 121 to any one of first through third radio sections 111 through 113 in accordance with a preset priority order.

A description of the operation of portable radio device 100 having a plurality of radio sections capable of diversity operation configured as described above is given below.

In portable radio device 100 incorporating first through third radio sections 111 through 113 capable of diversity operation, one diversity antenna is shared by a plurality of radio sections. Switching section 120 switches connection of one sub-antenna apparatus 121 to any one of first through third radio sections 111 through 113 in accordance with a preset priority order. In the event of simultaneous diversity operation requests, switching section 120 decides which radio section performs diversity operation based on the preset priority order.

For example, when first radio section 111 performs diversity operation, first radio section 111 and sub-antenna apparatus 121 are connected via switching section 120. Similarly, when second radio section 112 performs diversity operation, second radio section 112 and sub-antenna apparatus 121 are connected via switching section 120, and when third radio section 113 performs diversity operation, third radio section 113 and sub-antenna apparatus 121 are connected via switching section 120.

In the event of simultaneous diversity operation requests for first radio section 111 and second radio section 112—that is, in the event of conflict between these diversity operations—diversity operation of first radio section 111 (the mobile phone radio section), for example, has priority based on the preset priority order, and switching section 120 switches to connection of first radio section 111 to sub-antenna apparatus 121. In this case, second radio section 112 that is disconnected from sub-antenna apparatus 121 by switching section 120 can no longer perform diversity operation. Since one sub-antenna apparatus 121 for diversity use is shared by first through third radio sections 111 through 113, even if first through third radio sections 111 through 113 all wish to perform diversity operation simultaneously, diversity operation cannot be performed simultaneously, and one or another of first through third radio sections 111 through 113 performs diversity operation. However, in this embodiment, points such as the following are considered: (a) diversity operation is secured dependably for at least one radio section (here, first radio section 111); (b) the frequency of simultaneous diversity operation requests is assumed to be low; and (c) by means of switching section 120 switching control, high-priority diversity operation is secured, and a substantive drop in performance is avoided. Thus, (a) through (c) can offer security against the shortcoming of not being able to perform simultaneous diversity operation. On the other hand, suppressing simultaneous diversity operation enables one sub-antenna apparatus 121 for diversity use to be shared by radio sections 111 through 113, making it possible to obtain the extremely significant effect of reducing size, thickness, weight, and manufacturing cost by reducing the number of antennas.

As described above, according to this embodiment, portable radio device 100 is equipped with first through third radio sections 111 through 113 capable of diversity operation, and switching section 120 that switches connection of sub-antenna apparatus 121 to any one of first through third radio sections 111 through 113 at the time of diversity operation, enabling one diversity antenna to be shared by a plurality of radio sections. Thus, according to this embodiment, the number of diversity antennas is reduced, enabling the size, thickness, weight, and manufacturing cost of a terminal to be reduced.

Embodiment 2

In Embodiment 2 and subsequent embodiments, actual examples of switching by switching section 120 are described.

Figure 3:
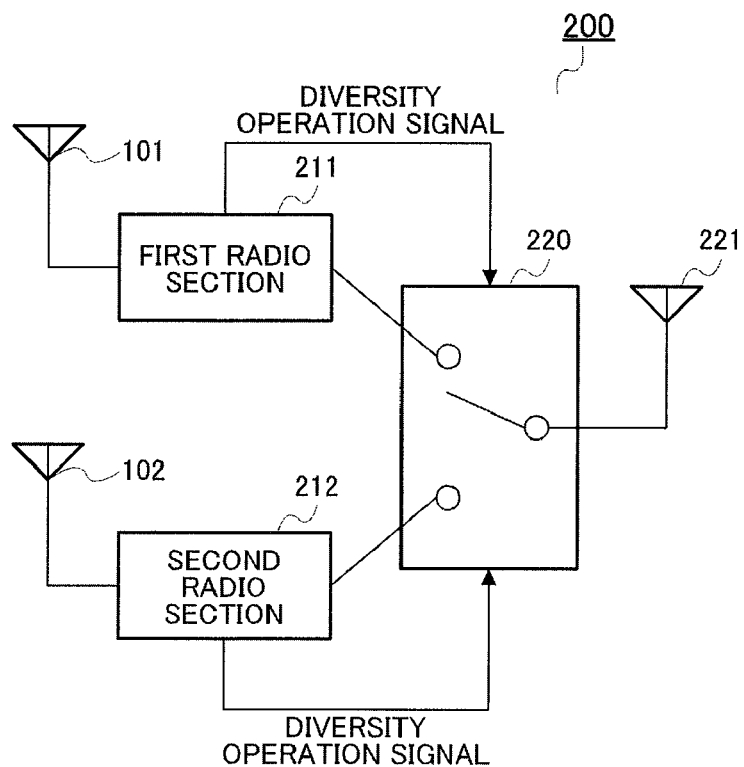
FIG. 3 is a drawing showing a configuration of a portable radio device according to Embodiment 2 of the present invention.

FIG. 3 is a drawing showing a configuration of a portable radio device having a plurality of radio sections capable of diversity operation according to Embodiment 2 of the present invention. In this embodiment, a case in which there are two radio sections capable of diversity operation is taken as an example, but the number of radio sections capable of diversity operation and the number of main antenna apparatuses may also be three, as described in Embodiment 1.

In FIG. 3, portable radio device 200 having a plurality of radio sections capable of diversity operation comprises first and second antenna apparatuses 101 and 102, first and second radio sections 211 and 212 capable of diversity operation that are connected to first and second antenna apparatuses 101 and 102 respectively, third antenna apparatus 221 for diversity operation that is connected to one or the other of first and second radio sections 211 and 212 at the time of diversity operation, and switching section 220 that switches connection of third antenna apparatus 221 to one or the other of first and second antenna apparatuses 101 and 102 at the time of diversity operation. Above-mentioned first and second antenna apparatuses 101 and 102 are any of first through third main antenna apparatuses 101, 102, and 103 of portable radio device 100 in FIG. 2, or antenna apparatuses for performing diversity operation together with third antenna apparatus 221.

First and second radio sections 211 and 212 are radio sections capable of diversity operation. First radio section 211 performs diversity operation by means of first antenna apparatus 101 and third antenna apparatus 221, and second radio section 212 by means of second antenna apparatus 102 and third antenna apparatus 221.

First radio section 211 is, for example, an HSDPA mobile phone radio section.

Second radio section 212 is, for example, a digital TV tuner for one-segment broadcasting reception, a WLAN radio section, or a UWB radio section.

When first and second radio sections 211 and 212 perform diversity operation, diversity operation is performed by a combination of first and second antenna apparatuses 101 and 102 and third antenna apparatus 221. That is to say, there is no main/sub relationship among the antennas. Thus, the antennas are not called main/sub antennas, but first through third antenna apparatuses 211, 212, and 221. First and second antenna apparatuses 101 and 102 correspond to first and second antenna apparatuses 101 and 102 in FIG. 2, and third antenna apparatus 221 corresponds to sub-antenna apparatus 121 in FIG. 2.

switching section 220 connects one or the other of first and second radio sections 211 and 212 to third antenna apparatus 221 in accordance with diversity operation signals input from first and second radio sections 211 and 212.

In this embodiment, switching section 220 performs switching that connects one third antenna apparatus 221 to one or the other of first and second radio sections 211 and 212 in accordance with diversity operation signals input from first and second radio sections 211 and 212. Here, it is desirable for a priority order to be set for switching section 220 switching operations between a diversity operation signal input from first radio section 211 and a diversity operation signal input from second radio section 212. For example, if a diversity operation signal input from first radio section 211 is set as being a control signal of higher priority than a diversity operation signal input from second radio section 212, first radio section 211 diversity operation can be given priority in the event of simultaneous diversity operation requests for first and second radio sections 211 and 212.

The switching operation by switching section 220 is not limited to the above, and may be of any kind. For example, a mode may also be used whereby a diversity operation signal input first is given priority, and a diversity operation signal input later is considered to be invalid until the diversity operation signal input first is cleared.

Embodiment 3

Figure 4:
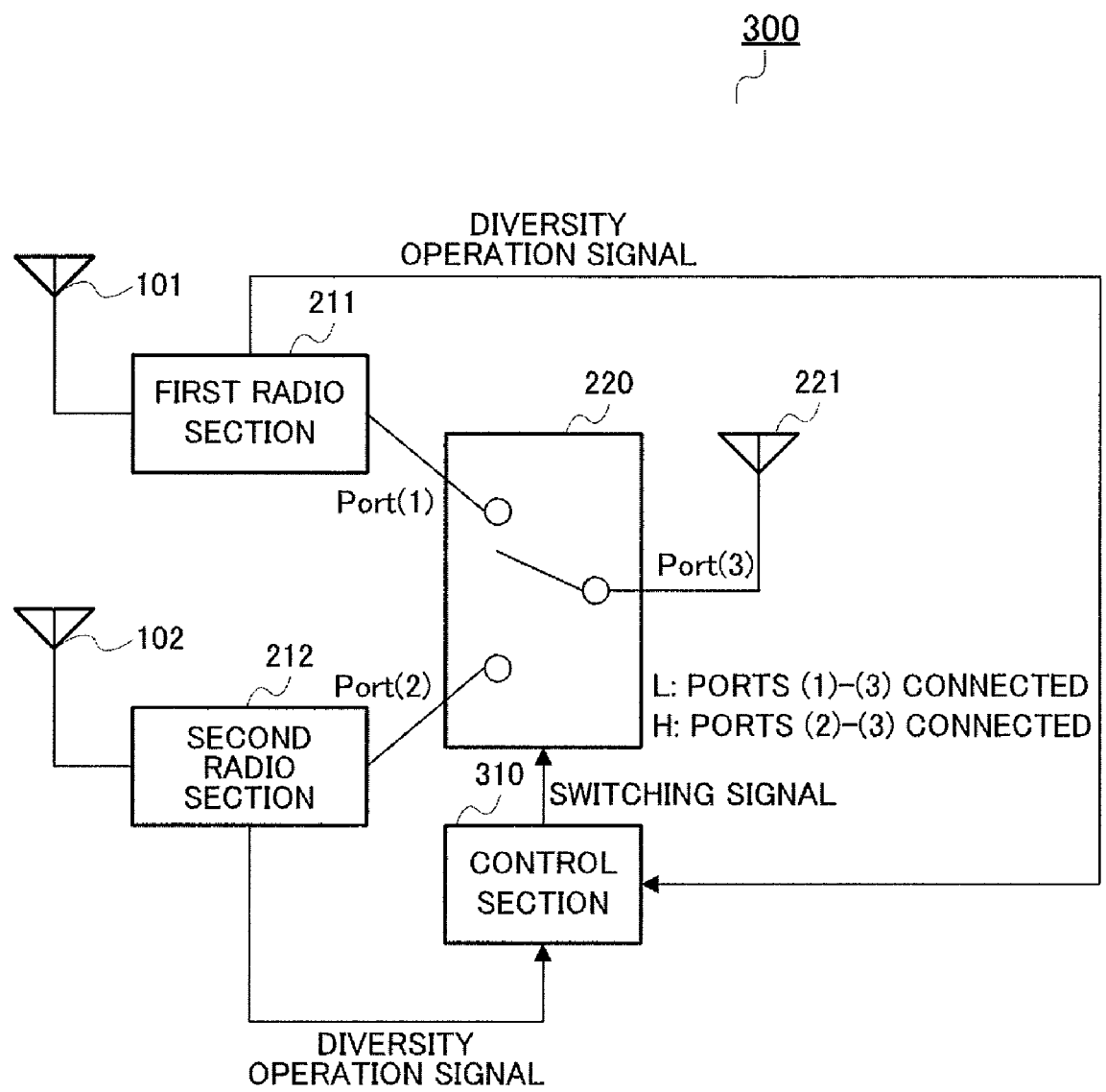
FIG. 4 is a drawing showing a configuration of a portable radio device according to Embodiment 3 of the present invention.

FIG. 4 is a drawing showing a configuration of a portable radio device having a plurality of radio sections capable of diversity operation according to Embodiment 3 of the present invention. Configuration parts identical to those in FIG. 3 are assigned the same reference codes as in FIG. 3, and duplicate descriptions are omitted here.

In FIG. 4, portable radio device 300 having a plurality of radio sections capable of diversity operation comprises first and second antenna apparatuses 101 and 102, first and second radio sections 211 and 212 capable of diversity operation that are connected to first and second antenna apparatuses 101 and 102 respectively, third antenna apparatus 221 for diversity operation that is connected to one or the other of first and second radio sections 211 and 212 at the time of diversity operation, switching section 220 that switches connection of third antenna apparatus 221 to one or the other of first and second antenna apparatuses 101 and 102 at the time of diversity operation, and control section 310 that controls switching by switching section 220.

First and second radio sections 211 and 212 are radio sections capable of diversity operation. First radio section 211 performs diversity operation by means of first antenna apparatus 101 and third antenna apparatus 221, and second radio section 212 by means of second antenna apparatus 102 and third antenna apparatus 221.

When performing diversity operation, the respective one of first and second radio sections 211 and 212 outputs a diversity operation signal to control section 310. It is desirable for the above diversity operation signal to be a status signal giving external notification of the state at the time of diversity operation. Alternatively, the above diversity operation signal may be a diversity operation start signal when starting diversity operation, or a diversity operation request.

Switching section 220 has port (1) to which first radio section 211 is connected, port (2) to which second radio section 212 is connected, and port (3) to which third antenna apparatus 221 is connected, and switches port (3) to port (1) or port (2) in accordance with a switching signal from control section 310. A switching signal from control section 310 is an H/L signal, and switching section 220 makes a port (1)-port (3) connection in the case of an L switching signal, and makes a port (2)-port (3) connection in the case of an H switching signal.

Control section 310 generates a switching signal connecting third antenna apparatus 221 to one or the other of first and second radio sections 211 and 212 in accordance with diversity operation signals input from first and second radio sections 211 and 212, and outputs this switching signal to switching section 220.

Figure 5:
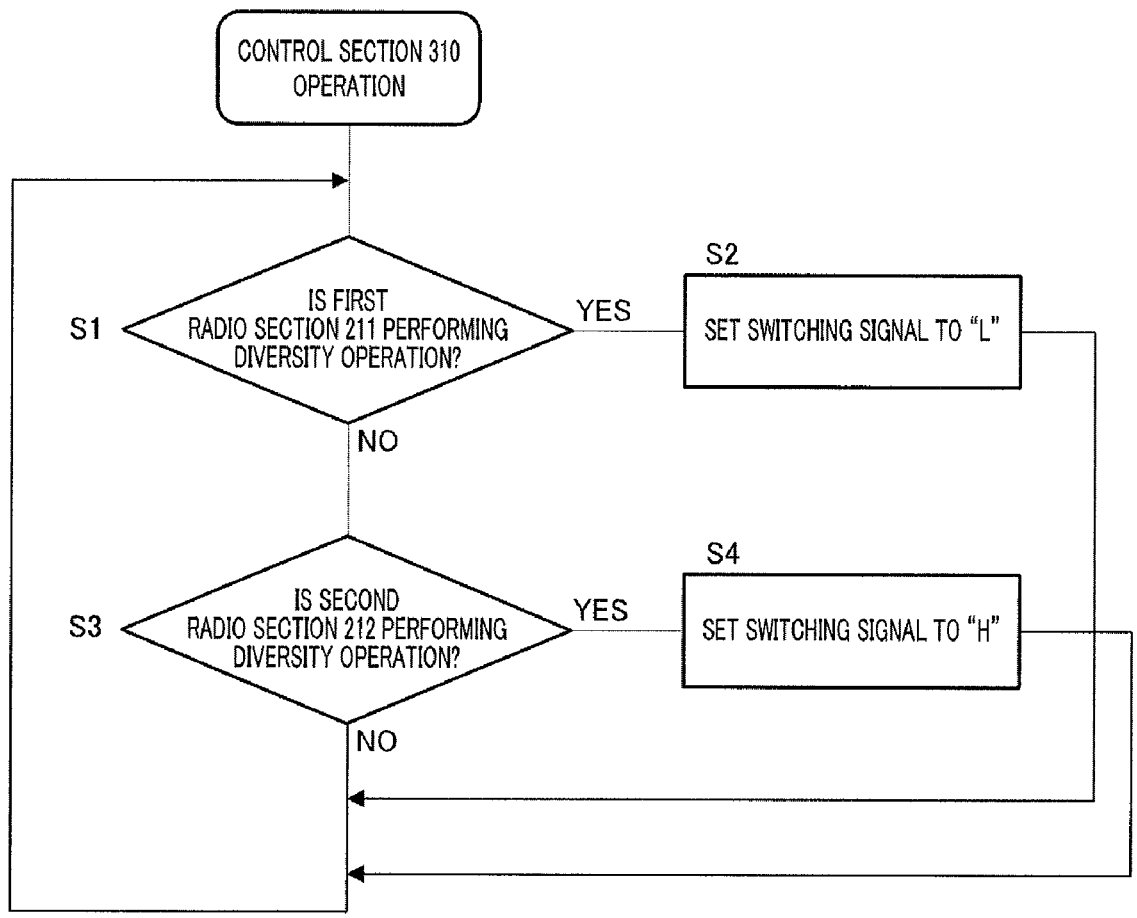
FIG. 5 is a flowchart showing the operation of a control section of a portable radio device according to Embodiment 3 of the present invention.

Control section 310 performs control to generate a switching signal for a switching operation by switching section 220 in accordance with the operation flow shown in FIG. 5, and outputs this switching signal to switching section 220. Control section 310 may comprise a microprocessor or the like, or may comprise electronic circuitry such as logic circuitry and a timer. If control section 310 comprises a microprocessor or the like, a resource such as a CPU with which portable radio device 300 is provided as a main function may be used.

FIG. 5 is a flowchart showing the operation of control section 310. In FIG. 5, "S" indicates a step of the processing flow. If control section 310 comprises a microprocessor or the like as described above, this flow is executed repeatedly at predetermined intervals by a microprocessor or the like.

In step S1, control section 310 determines whether or not first radio section 211 is performing diversity operation. When first radio section 211 attempts to execute diversity operation, it outputs a diversity operation signal. Control section 310 can determine whether or not first radio section 211 is performing diversity operation according to whether or not it detects a diversity operation signal input from first radio section 211.

If radio section 211 is performing diversity operation, control section 310 sets a switching signal output to switching section 220 to "L" in step S2, and returns to above step S1. Switching section 220 makes a port (1)-port (3) connection in accordance with the "L" switching signal, and first radio section 211 diversity operation becomes possible.

If first radio section 211 is not performing diversity operation, in step S3 control section 310 determines whether or not second radio section 212 is performing diversity operation. When second radio section 212 attempts to execute diversity operation, it outputs a diversity operation signal. Control section 310 can determine whether or not second radio section 212 is performing diversity operation according to whether or not it detects a diversity operation signal input from second radio section 212.

If second radio section 212 is performing diversity operation, control section 310 sets a switching signal output to switching section 220 to "H" in step S4, and returns to above step S1. Switching section 220 makes a port (2)-port (3) connection in accordance with the "H" switching signal, and second radio section 212 diversity operation becomes possible.

If second radio section 212 is not performing diversity operation in above step S3, control section 310 determines that neither of first and second radio sections 211 and 212 is performing diversity operation, and returns to above step S1.

As shown in the above flow, if first radio section 211 is performing diversity operation in step S1, a switching signal output to switching section 220 is set to "L" in step S2 and the processing flow returns to step S1, and second radio section 212 diversity operation of step S3 onward is not performed. That is to say, if first radio section 211 diversity operation is decided, a second radio section 212 diversity operation request is ignored.

Thus, according to this embodiment, control section 310 of portable radio device 300 performs switching control that connects third antenna apparatus 221 to one or the other of first and second radio sections 211 and 212 in accordance with diversity operation signals input from first and second radio sections 211 and 212, and therefore one diversity antenna (third antenna apparatus 221) can be shared by a plurality of radio sections (first and second radio sections 211 and 212) in the same way as in Embodiments 1 and 2. Thus, according to this embodiment, the number of diversity antennas is reduced, enabling the size, thickness, weight, and manufacturing cost of a terminal to be reduced.

An effect of configuring control section 310 using a resource such as a CPU with which portable radio device 300 is provided as a main function is that there are no additional members and implementation is simple. Another advantage is that priority order setting and changing can also be performed easily.

In this embodiment, a priority order is preset and first radio section 211 is given priority, but the priority order setting is not limited to the above, and may be of any kind. For example, a mode may also be used whereby a diversity operation signal input first is given priority, and a diversity operation signal input later is considered to be invalid until the diversity operation signal input first is cleared.

Embodiment 4

Figure 6:
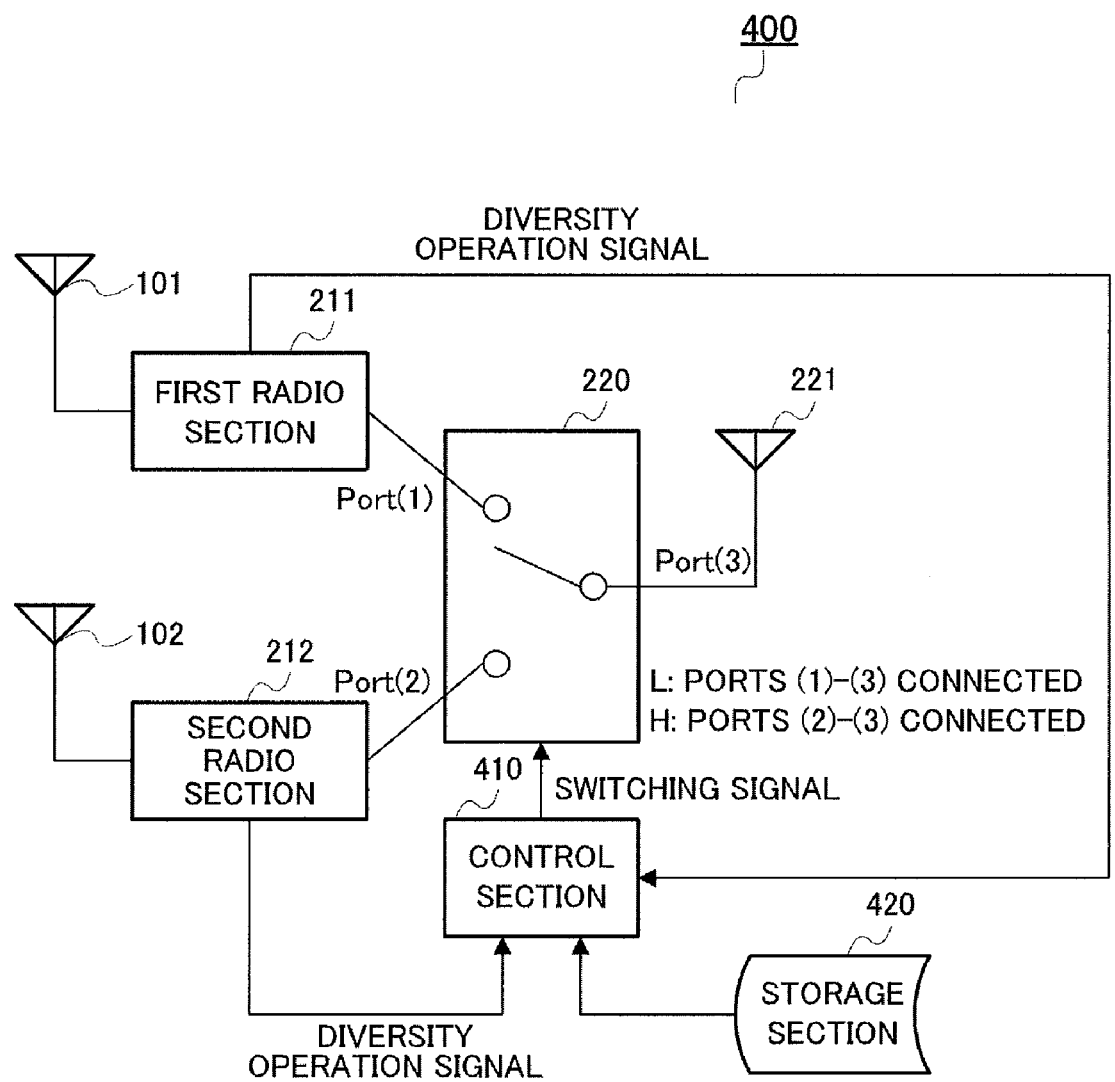
FIG. 6 is a drawing showing a configuration of a portable radio device according to Embodiment 4 of the present invention.

FIG. 6 is a drawing showing a configuration of a portable radio device having a plurality of radio sections capable of diversity operation according to Embodiment 4 of the present invention. Configuration parts identical to those in FIG. 4 are assigned the same reference codes as in FIG. 4, and duplicate descriptions are omitted here.

In FIG. 6, portable radio device 400 having a plurality of radio sections capable of diversity operation comprises first and second antenna apparatuses 101 and 102, first and second radio sections 211 and 212 capable of diversity operation that are connected to first and second antenna apparatuses 101 and 102 respectively, third antenna apparatus 221 for diversity operation that is connected to one or the other of first and second radio sections 211 and 212 at the time of diversity operation, switching section 220 that switches connection of third antenna apparatus 221 to one or the other of first and second antenna apparatuses 101 and 102 at the time of diversity operation, control section 410 that controls switching by switching section 220, and storage section 420 that stores priority order data.

Switching section 220 has port (1) to which first radio section 211 is connected, port (2) to which second radio section 212 is connected, and port (3) to which third antenna apparatus 221 is connected, and switches port (3) to port (1) or port (2) in accordance with a switching signal from control section 410. A switching signal from control section 310 is an H/L signal, and switching section 220 makes a port (1)-port (3) connection in the case of an L switching signal, and makes a port (2)-port (3) connection in the case of an H switching signal.

Control section 410 generates a switching signal connecting third antenna apparatus 221 to one or the other of first and second radio sections 211 and 212 in accordance with diversity operation signals input from first and second radio sections 211 and 212 and priority order stored data called from storage section 420, and outputs this switching signal to switching section 220.

Control section 410 performs control to generate a switching signal for a switching operation by switching section 220 in accordance with the operation flow shown in FIG. 5, and outputs this switching signal to switching section 220.

Storage section 420 comprises nonvolatile memory such as EEPROM (Electronically Erasable and Programmable ROM), or an HDD (Hard Disk Drive), and stores user-settable priority order data. Setting changes can be made arbitrarily by a user to priority order data stored in storage section 420 by means of a key input section or the like (not shown). Storage section 420 has a function as a setting section that sets a priority order.

Figure 7:
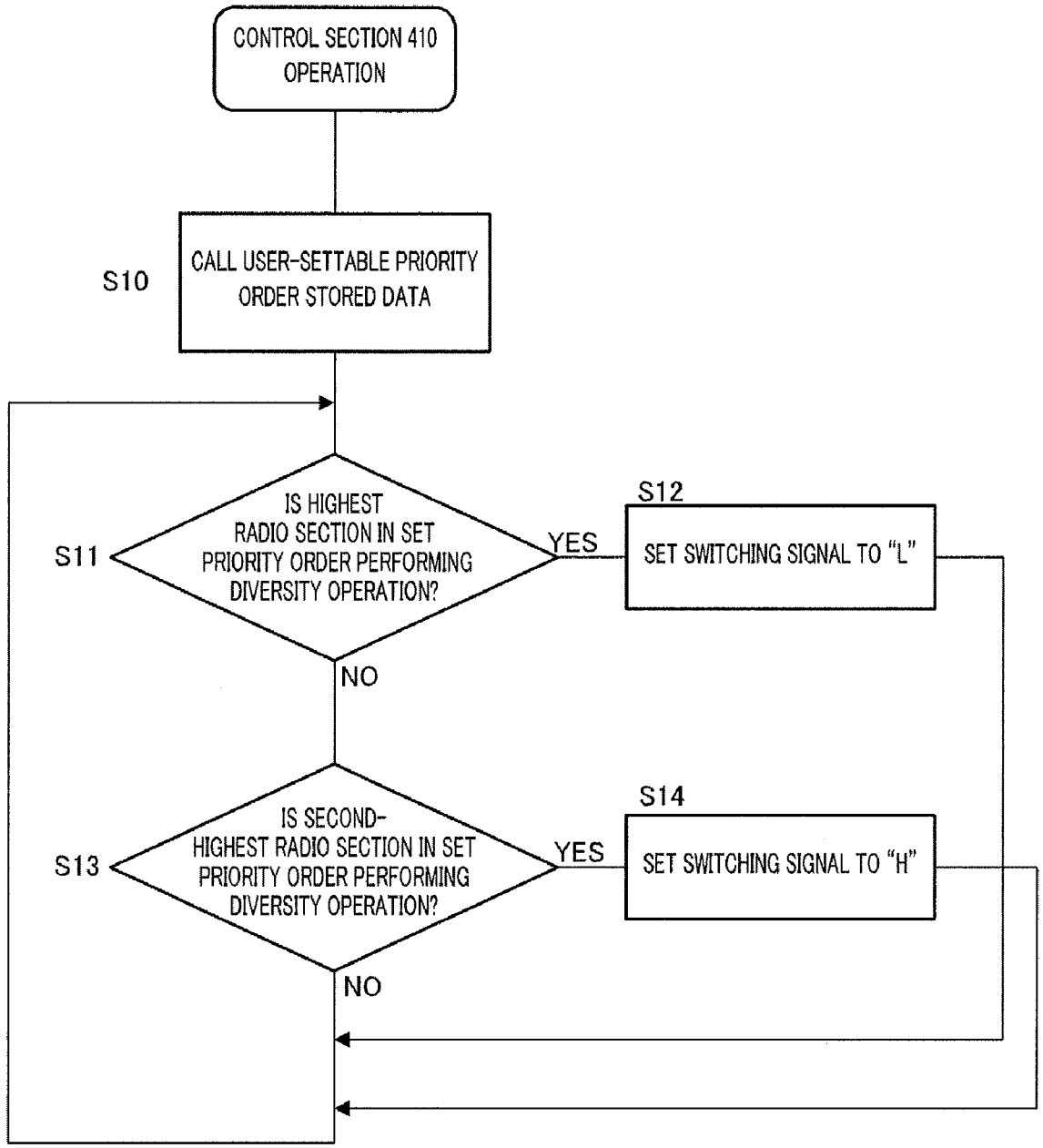
FIG. 7 is a flowchart showing the operation of a control section of a portable radio device according to Embodiment 4 of the present invention.

FIG. 7 is a flowchart showing the operation of control section 410, and is executed by control section 410 comprising a microprocessor or the like.

In step S10, control section 410 calls user-settable priority order stored data from storage section 420.

In step S11, control section 410 determines whether or not the highest radio section in the set priority order is performing diversity operation. The highest radio section in the set priority order is, for example, first radio section 211, but can be set arbitrarily, such as to second radio section 212, by means of a user setting. When first radio section 211 attempts to execute diversity operation, it outputs a diversity operation signal. Control section 410 can determine whether or not first radio section 211 is performing diversity operation according to whether or not it detects a diversity operation signal input from first radio section 211.

If the highest radio section in the set priority order is performing diversity operation, control section 410 sets a switching signal output to switching section 220 to "L" in step S12, and returns to above step S11. If the highest radio section in the set priority order is first radio section 211, switching section 220 makes a port (1)-port (3) connection in accordance with the "L" switching signal, and first radio section 211 diversity operation becomes possible.

If the highest radio section in the set priority order is not performing diversity operation, in step S13 control section 410 determines whether or not the second-highest radio section in the set priority order is performing diversity operation. When second radio section 212 attempts to execute diversity operation, it outputs a diversity operation signal. Control section 410 can determine whether or not second radio section 212 is performing diversity operation according to whether or not it detects a diversity operation signal input from second radio section 212.

If the second-highest radio section in the set priority order is performing diversity operation, control section 410 sets a switching signal output to switching section 220 to "H" in step S14, and returns to above step S11. If the second-highest radio section in the set priority order is second radio section 212, switching section 220 makes a port (2)-port (3) connection in accordance with the "H" switching signal, and second radio section 212 diversity operation becomes possible.

If the second-highest radio section in the set priority order is not performing diversity operation in above step S13, control section 410 determines that neither the highest radio section nor the second-highest radio section in the set priority order is performing diversity operation, and returns to above step S11.

As shown in the above flow, if the highest radio section in the set priority order is performing diversity operation in step S11, a switching signal output to switching section 220 is set to "L" in step S12 and the processing flow returns to step S11, and therefore diversity operation of the highest radio section in the set priority order is given priority over diversity operation of the second-highest radio section in the set priority order.

Thus, according to this embodiment, storage section 420 that stores user-settable priority order data is provided, and control section 410 performs switching control by calling user-settable priority order data from storage section 420, and therefore, in addition to obtaining the effect of Embodiment 3, radio section diversity operation can be executed in accordance with a user setting, and a method of use can be provided that is in line with a user's wishes.

In this embodiment, a priority order is preset and first radio section 211 is given priority, but the setting is not limited to the above, and may be of any kind.

Embodiment 5

Figure 8:
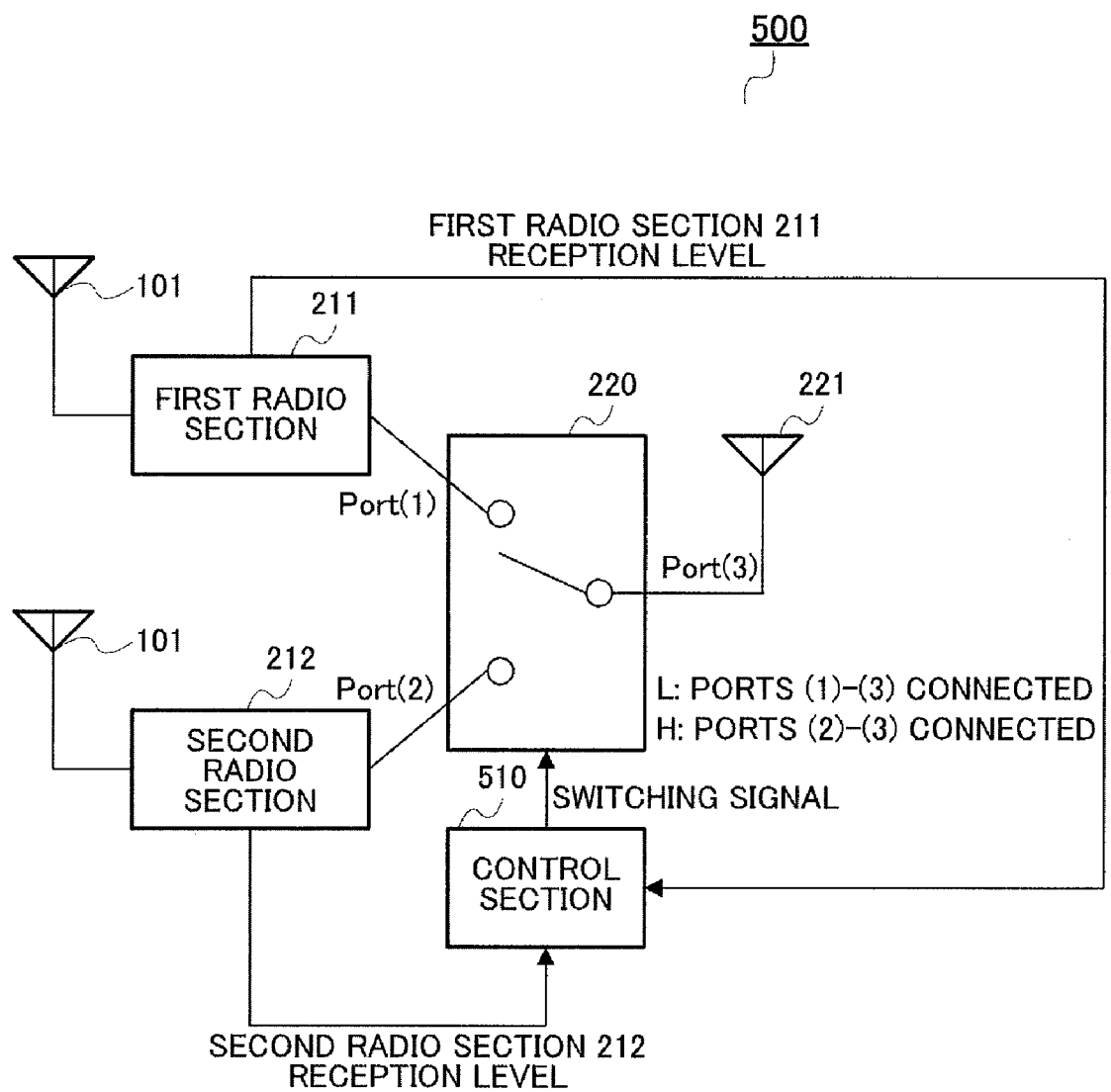
FIG. 8 is a drawing showing a configuration of a portable radio device according to Embodiment 5 of the present invention.

FIG. 8 is a drawing showing a configuration of a portable radio device having a plurality of radio sections capable of diversity operation according to Embodiment 5 of the present invention. Configuration parts identical to those in FIG. 4 are assigned the same reference codes as in FIG. 4, and duplicate descriptions are omitted here.

In FIG. 8, portable radio device 500 having a plurality of radio sections capable of diversity operation comprises first and second antenna apparatuses 101 and 102, first and second radio sections 211 and 212 capable of diversity operation that are connected to first and second antenna apparatuses 101 and 102 respectively, third antenna apparatus 221 for diversity operation that is connected to one or the other of first and second radio sections 211 and 212 at the time of diversity operation, switching section 220 that switches connection of third antenna apparatus 221 to one or the other of first and second antenna apparatuses 101 and 102 at the time of diversity operation, and control section 510 that controls switching by switching section 220.

First and second radio sections 211 and 212 are radio sections capable of diversity operation. First radio section 211 performs diversity operation by means of first antenna apparatus 101 and third antenna apparatus 221, and second radio section 212 by means of second antenna apparatus 102 and third antenna apparatus 221.

First and second radio sections 211 and 212 output their respective reception levels to control section 510. An above reception level can be ascertained from an RSSI (Received Signal Strength Indicator), BER (Bit Error Rate), SNR (Signal to Noise Ratio), or antenna input power level measurement, for instance.

Switching section 220 has port (1) to which first radio section 211 is connected, port (2) to which second radio section 212 is connected, and port (3) to which third antenna apparatus is connected, and switches port (3) to port (1) or port (2) in accordance with a switching signal from control section 510. A switching signal from control section 510 is an H/L signal, and switching section 220 makes a port (1)-port (3) connection in the case of an L switching signal, and makes a port (2)-port (3) connection in the case of an H switching signal.

Control section 510 generates a switching signal connecting third antenna apparatus 221 to one or the other of first and second radio sections 211 and 212 in accordance with reception levels input from first and second radio sections 211 and 212, and outputs this switching signal to switching section 220.

Figure 9:
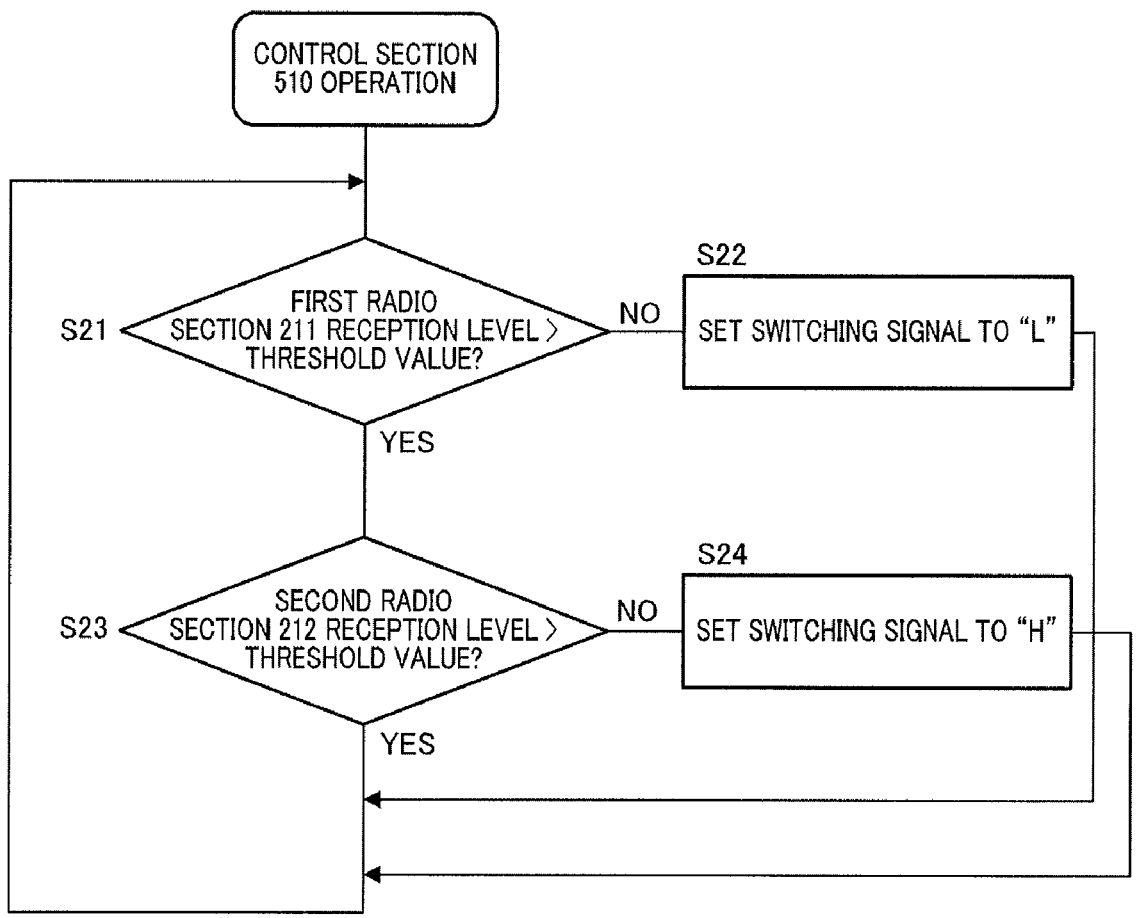
FIG. 9 is a flowchart showing the operation of a control section of a portable radio device according to Embodiment 5 of the present invention.

Control section 510 performs control to generate a switching signal for a switching operation by switching section 220 in accordance with the operation flow shown in FIG. 9, and outputs this switching signal to switching section 220.

FIG. 9 is a flowchart showing the operation of control section 510, and is executed by control section 510 comprising a microprocessor or the like.

In step S21, control section 510 determines whether or not the reception level of first radio section 211 is higher than a threshold value. First radio section 211 outputs an RSSI, BER, or suchlike reception level to control section 510.

If the reception level of first radio section 211 is less than or equal to the threshold value, control section 510 sets a switching signal output to switching section 220 to "L" in step S22, and returns to above step S21. Switching section 220 makes a port (1)-port (3) connection in accordance with the "L" switching signal, and first radio section 211 diversity operation becomes possible.

If the reception level of first radio section 211 is higher than the threshold value, in step S23 control section 510 determines whether or not the reception level of second radio section 212 is higher than the threshold value. Second radio section 212 outputs an RSSI, BER, or suchlike reception level to control section 510 in the same way as first radio section 211.

If the reception level of second radio section 212 is less than or equal to the threshold value, control section 510 sets a switching signal output to switching section 220 to "H" in step S24, and returns to above step S21. Switching section 220 makes a port (2)-port (3) connection in accordance with the "H" switching signal, and second radio section 212 diversity operation becomes possible.

If the reception level of second radio section 212 is higher than the threshold value in above step S23, control section 510 determines that the reception levels of both first and second radio sections 211 and 212 are higher than the threshold value and diversity operation is not necessary, and returns to above step S21.

As shown in the above flow, if the reception level of first radio section 211 is less than or equal to the threshold value in step S21, a switching signal output to switching section 220 is set to "L" in step S22 and the processing flow returns to step S21, and the threshold value determination for the reception level of second radio section 212 diversity operation in step S23 onward is not performed. That is to say, if first radio section 211 diversity operation is decided, a second radio section 212 diversity operation request is ignored.

Thus, according to this embodiment, control section 510 of portable radio device 500 performs switching control that connects third antenna apparatus 221 to one or the other of first and second radio sections 211 and 212 in accordance with the reception levels of first and second radio sections 211 and 212, and therefore a diversity antenna for diversity operation (third antenna apparatus 221) can be prepared irrespective of whether or not diversity operation is executed for first and second radio sections 211 and 212. By this means, effective diversity operation can be achieved when first and second radio sections 211 and 212 start diversity operation.

Also, in this embodiment, once connection of a diversity antenna (third antenna apparatus 221) has been completed, control section 510 can issue a diversity operation start report or directive to first and second radio sections 211 and 212.

In this embodiment, a priority order is preset and first radio section 211 is given priority, but the priority order setting is not limited to the above, and may be of any kind.

Also, it goes without saying that this embodiment may be combined with above-described Embodiments 1 through 4.

Embodiment 6

Figure 10:
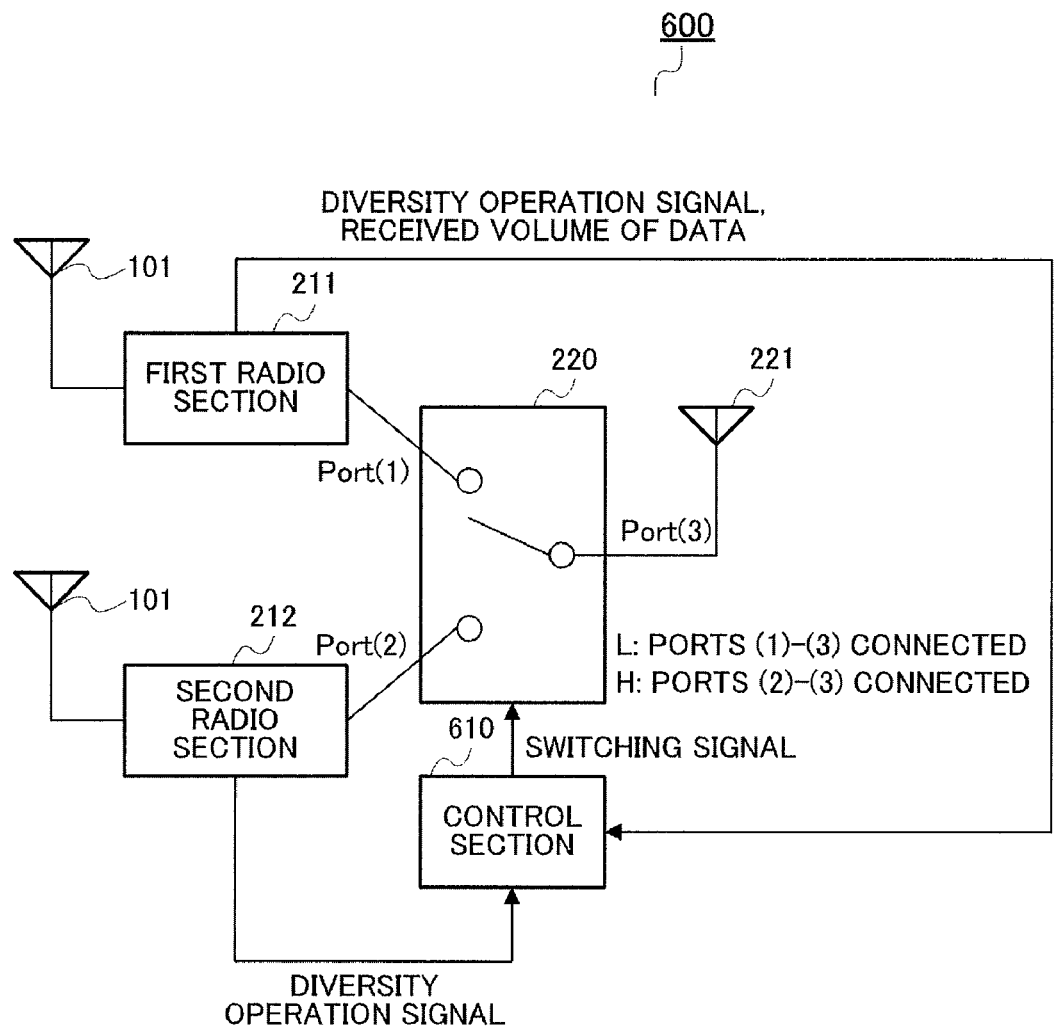
FIG. 10 is a drawing showing a configuration of a portable radio device according to Embodiment 6 of the present invention.

FIG. 10 is a drawing showing a configuration of a portable radio device having a plurality of radio sections capable of diversity operation according to Embodiment 6 of the present invention. Configuration parts identical to those in FIG. 4 are assigned the same reference codes as in FIG. 4, and duplicate descriptions are omitted here.

In FIG. 10, portable radio device 600 having a plurality of radio sections capable of diversity operation comprises first and second antenna apparatuses 101 and 102, first and second radio sections 211 and 212 capable of diversity operation that are connected to first and second antenna apparatuses 101 and 102 respectively, third antenna apparatus 221 for diversity operation that is connected to one or the other of first and second radio sections 211 and 212 at the time of diversity operation, switching section 220 that switches connection of third antenna apparatus 221 to one or the other of first and second antenna apparatuses 101 and 102 at the time of diversity operation, and control section 610 that controls switching by switching section 220.

First and second radio sections 211 and 212 are radio sections capable of diversity operation. First radio section 211 performs diversity operation by means of first antenna apparatus 101 and third antenna apparatus 221, and second radio section 212 by means of second antenna apparatus 102 and third antenna apparatus 221.

First radio section 211 is, for example, an HSDPA mobile phone radio section, and has higher priority than second radio section 212 (a digital TV tuner, for example).

When performing diversity operation, the respective one of first and second radio sections 211 and 212 outputs a diversity operation signal to control section 610. Furthermore, first radio section 211 outputs a capacity of data that it receives to control section 610 in addition to the diversity operation signal.

Switching section 220 has port (1) to which first radio section 211 is connected, port (2) to which second radio section 212 is connected, and port (3) to which third antenna apparatus 221 is connected, and switches port (3) to port (1) or port (2) in accordance with a switching signal from control section 610. A switching signal from control section 610 is an H/L signal, and switching section 220 makes a port (1)-port (3) connection in the case of an L switching signal, and makes a port (2)-port (3) connection in the case of an H switching signal.

Control section 610 generates a switching signal connecting third antenna apparatus 221 to one or the other of first and second radio sections 211 and 212 in accordance with diversity operation signals input from first and second radio sections 211 and 212 and a capacity of data input from first radio section 211, and outputs this switching signal to switching section 220.

Figure 11:
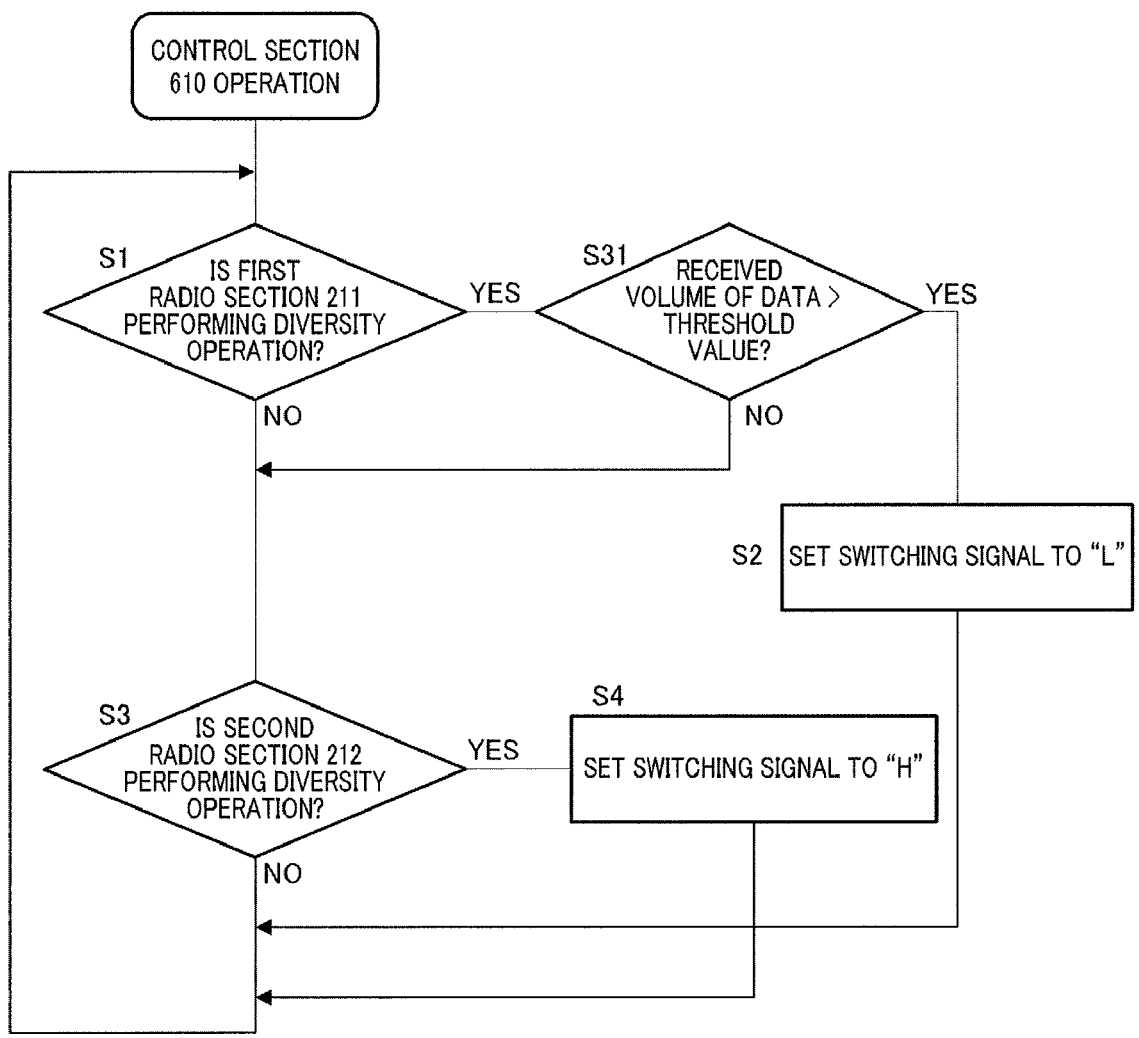
FIG. 11 is a flowchart showing the operation of a control section of a portable radio device according to Embodiment 6 of the present invention.

Control section 610 performs control to generate a switching signal for a switching operation by switching section 220 in accordance with the operation flow shown in FIG. 11, and outputs this switching signal to switching section 220.

FIG. 11 is a flowchart showing the operation of control section 610, and is executed by control section 610 comprising a microprocessor or the like. Steps in which the same processing is performed as in the flowchart in FIG. 5 are assigned the same step numbers as in FIG. 5.

In step S1, control section 610 determines whether or not first radio section 211 is performing diversity operation. When first radio section 211 attempts to execute diversity operation, it outputs a diversity operation signal. Control section 610 can determine whether or not first radio section 211 is performing diversity operation according to whether or not it detects a diversity operation signal input from first radio section 211.

If radio section 211 is performing diversity operation, in step S31 control section 610 compares the capacity of data received by first radio section 211 with a threshold value.

If the received capacity of data is higher than the threshold value in step S31, the processing flow proceeds to step S2; if the received capacity of data is less than or equal to the threshold value, the processing flow proceeds to step S3.

In step S2, control section 610 sets a switching signal output to switching section 220 to "L", and returns to above step S1. Switching section 220 makes a port (1)-port (3) connection in accordance with the "L" switching signal, and first radio section 211 diversity operation becomes possible.

If first radio section 211 is not performing diversity operation, in step S3 control section 610 determines whether or not second radio section 212 is performing diversity operation. When second radio section 212 attempts to execute diversity operation, it outputs a diversity operation signal. Control section 610 can determine whether or not second radio section 212 is performing diversity operation according to whether or not it detects a diversity operation signal input from second radio section 212.

If second radio section 212 is performing diversity operation, control section 610 sets a switching signal output to switching section 220 to "H" in step S4, and returns to above step S1. Switching section 220 makes a port (2)-port (3) connection in accordance with the "H" switching signal, and second radio section 212 diversity operation becomes possible.

If second radio section 212 is not performing diversity operation in above step S3, control section 610 determines that neither of first and second radio sections 211 and 212 is performing diversity operation, or that even if first radio section 211 is performing diversity operation the received capacity of data is low, and returns to above step S1.

As shown in the above flow, if first radio section 211 is performing diversity operation in step S1 and the received capacity of data is higher than the threshold value in step S31, control section 610 sets a switching signal output to switching section 220 to "L" in step S2, and returns to step S1. If first radio section 211 is performing diversity operation but the received capacity of data is low, control section 610 performs diversity operation determination for second radio section 212 in step S3 onward. That is to say, if first radio section 211 is performing diversity operation but the received capacity of data is low, it becomes possible for second radio section 212 to perform diversity operation.

Thus, according to this embodiment, control section 610 of portable radio device 600 performs switching control that connects third antenna apparatus 221 to one or the other of first and second radio sections 211 and 212 in accordance with the reception level of first radio section 211 in addition to diversity operation signals of first and second radio sections 211 and 212, and therefore provision can be made for second radio section 212 to be able to perform diversity operation if first radio section 211 is performing diversity operation but the capacity of data is low. By this means, it becomes possible for diversity operation to be performed by second radio section 212 if the capacity of data of first radio section 211 is low, and an improvement in the overall operating performance of portable radio device 600 can be expected compared with Embodiment 3 in which high-priority first radio section 211 performs diversity operation in a single uniform way.

It goes without saying that this embodiment may be combined with above-described Embodiments 1 through 5.

The above description presents examples of preferred embodiments of the present invention, but the scope of the present invention is not limited to these.

The present invention can be applied to any kind of apparatus as long as it is a portable radio device having a plurality of radio sections. For example, the present invention can be applied not only to a mobile phone/PHS (Personal Handy-Phone System), but also to a portable information terminal such as a PDA (Personal Digital Assistant), and an information processing apparatus such as a notebook PC.

In the above embodiments, a used frequency band is not limited to a DTV band, but may be any kind of band. A portable radio device capable of combined use of PDC (Personal Digital Cellular) utilizing the 900 MHz band and CDMA (Code Division Multiple Access) utilizing the 2 GHz band has been commercialized in Japan as a portable radio device supporting a plurality of frequency bands. Outside of Japan, a portable radio device has been commercialized that is capable of combined use of GSM (Global System for Mobile Communications) utilizing the 900 MHz band, DCS (Digital Communication System) utilizing the 1.8 GHz band, PCS (Personal Communication Services) utilizing the 1.9 GHz band, and UMTS (Universal Mobile Telecommunications System) utilizing the 2 GHz band. One possibility, for example, is a case in which a first frequency band is a 2 GHz single band, and a second frequency band comprises three bands: 900 MHz, 1.8 GHz, and 1.9 GHz.

In the above embodiments, the term "portable radio device" has been used, but this is simply for convenience of description, and terms such as "mobile phone", "wireless communication apparatus", and the like may, of course, also be used.

The type, number, connection method, and so forth of circuit sections configuring an above-described portable radio device are not limited to those in the above embodiments.

The disclosure of Japanese Patent Application No. 2007-293481, filed on Nov. 12, 2007, including the specification, drawings and abstract, is incorporated herein by reference in its entirety.

INDUSTRIAL APPLICABILITY

A portable radio device according to the present invention enables a portable radio device to be provided that has a plurality of radio sections capable of diversity operation and is suitable for downsizing. Also, there is no need for a plurality of diversity antennas, and it is possible to reduce the case size and manufacturing cost with a simple circuit configuration. Furthermore, the present invention is useful for achieving high wireless communication performance of a portable radio device.

The invention claimed is:

1. A portable radio device comprising:
a first radio section capable of diversity operation;
a first antenna connected to the first radio section;
a second radio section capable of diversity operation;
a second antenna connected to the second radio section;
a third antenna that can be connected to the first radio section or the second radio section at a time of diversity operation;
a switching section configured to couple the third antenna to the first radio section or the second radio section based at least on an input from a control section; and
the control section configured to detect an amount of received data of the first radio section, the control section further configured to compare the detected amount to a determined threshold and to generate the input to the switching section based at least on a comparison between the detected amount of the received data and the determined threshold.

2. The portable radio device according to claim 1, wherein the control section is further configured to detect that the first radio section is performing diversity operation.

3. The portable radio device according to claim 2, wherein the control section, when detecting that the first radio section is performing diversity operation and that the detected amount of received data in the first radio is less than or equal to the determined threshold, generates the input to the switching section causing the switching section to couple the third antenna to the second radio section.

4. The portable radio device according to claim 2, wherein the control section, when detecting that the first radio section is not performing diversity operation, generates the input to the switching section, said input causing the switching section to couple the third antenna to the second radio section.

5. The portable radio device according to claim 2, wherein the control section, when detecting that the first radio section is performing diversity operation and the detected amount of received data is more than the determined threshold, generates the input to the switching section, said input causing the switching section to couple the third antenna to the first radio section.

* * * * *